US008397275B1

(12) United States Patent  
Magdsick

(10) Patent No.: US 8,397,275 B1  
(45) Date of Patent: Mar. 12, 2013

(54) TIME-VARYING SEQUENCED IMAGE OVERLAYS FOR CAPTCHA

(75) Inventor: Karl Magdsick, New York, NY (US)

(73) Assignee: Google Inc., Mountain View, CA (US)

( * ) Notice: Subject to any disclaimer, the term of this patent is extended or adjusted under 35 U.S.C. 154(b) by 953 days.

(21) Appl. No.: 12/366,592

(22) Filed: Feb. 5, 2009

(51) Int. Cl.  
*G08B 29/00* (2006.01)

(52) U.S. Cl. ............... 726/2; 726/21; 726/3; 380/54; 380/200; 380/213; 380/255

(58) Field of Classification Search .............. 726/3, 2, 726/21; 380/54, 200, 213, 255; 713/201, 713/202  
See application file for complete search history.

(56) References Cited

U.S. PATENT DOCUMENTS

| | | | | |
|---|---|---|---|---|
| 5,488,664 | A * | 1/1996 | Shamir | 380/54 |
| 7,667,871 | B1 * | 2/2010 | Roskind et al. | 358/1.9 |
| 8,209,743 | B1 * | 6/2012 | Frank | 726/2 |
| 2005/0044395 | A1 * | 2/2005 | Staring et al. | 713/200 |
| 2005/0117748 | A1 * | 6/2005 | Schrijen et al. | 380/200 |
| 2005/0180569 | A1 * | 8/2005 | Kevenaar et al. | 380/213 |
| 2006/0177060 | A1 * | 8/2006 | Johnson et al. | 380/255 |
| 2006/0227969 | A1 * | 10/2006 | Johnson et al. | 380/210 |
| 2008/0216163 | A1 * | 9/2008 | Pratte et al. | 726/7 |
| 2009/0187986 | A1 * | 7/2009 | Ozeki | 726/21 |
| 2009/0235327 | A1 * | 9/2009 | Jakobsson et al. | 726/2 |
| 2009/0268904 | A1 * | 10/2009 | Verhulst et al. | 380/54 |
| 2009/0313694 | A1 * | 12/2009 | Mates | 726/21 |
| 2009/0328150 | A1 * | 12/2009 | Gross | 726/3 |
| 2011/0191820 | A1 * | 8/2011 | Ivey | 726/3 |

FOREIGN PATENT DOCUMENTS

TW 424378 A * 3/2001

OTHER PUBLICATIONS

"Visual cryptography," Wikipedia, Last modified Nov. 12, 2008, 2 Pages, [online] [retrieved on Nov. 13, 2009] Retrieved from the internet <URL:http://en.wikipedia.org/wiki/Visual_crytography>.  
Moni Naor and Adi Shamir, Visual Cryptography, Eurocrypt 1994, pp. 1-12.

* cited by examiner

*Primary Examiner* — Tamara Teslovich  
(74) *Attorney, Agent, or Firm* — Fenwick & West LLP

(57) ABSTRACT

Time-varying CAPTCHA tests are provided to distinguish a human user from a computer software agent in an online application. A test generator generates an original image and a set of (X,Y) positions. The (X,Y) positions can be a random or repeating sequence. The test generator then separates the original image to form a plurality of secondary images. The secondary images are configured to the (X,Y) positions and the original image so that when the secondary images are displaced over time responsive to the (X,Y) positions at least one of the (X,Y) position reveals the original image, or a portion thereof. A test program generator generates an executable program adapted for execution on a client device. The executable program is encoded with the (X,Y) positions and the secondary images, and configured to displace the secondary images over time responsive to the set of positions.

43 Claims, 15 Drawing Sheets

WHICH THREE LETTERS ARE ILLUSTRATED BELOW?

ANSWER:

WHICH THREE LETTERS ARE ILLUSTRATED BELOW?

ANSWER:

TIME-VARYING SEQUENCED IMAGE OVERLAYS FOR CAPTCHA

BACKGROUND OF THE INVENTION

1. Field of the Invention

The present invention relates generally to methods and systems to serve data over a network, and in particular to automatically generate tests to distinguish human users from computer software agents in a communications network.

2. Background

CAPTCHA stands for "Completely Automated Public Turing Test to Tell Computers and Humans Apart". A CAPTCHA is a test that can be automatically generated, which most human can pass, but that current computer programs cannot pass. CAPTCHAs have been used to prevent malicious third parties from using automated means ("bots") to perform actions that are intended specifically for humans, such as account registration, service provisioning, bill payment, and so forth. Excessive use of such services by bots leads to decreased quality of service for the given system, as well as problems involving fraud, identity theft, and unauthorized commercial promotion ("spam").

For example, some online businesses offer free online services such as email, online storage, search engines, forums, and the like. Difficulties arise for these businesses when bots are used to send large numbers of requests to the service over a short period of time. Similarly, email service providers suffer when bots are used to sign up for large numbers of email accounts which are later used to send junk emails.

One way of thwarting bots is to implement CAPTCHA in such a way that a user is required to solve a task prior to being allowed access to services intended specifically for humans. Currently there exists a variety of CAPTCHA implementations that provide different types of tasks. Types of tasks include: text recognition, image recognition, and speech recognition.

GIMPY and EZ-GIMPY are two of many CAPTCHA implementations based on the difficulty of reading distorted text. GIMPY works by selecting several words out of a dictionary and rendering a distorted image containing the words. GIMPY then displays the distorted image, and requires the human user to input the words in the image. Most humans can read the words from the distorted image, but current computer programs cannot. The majority of CAPTCHAs used on the Web today are similar to GIMPY in that they require the user to correctly identify some content in a distorted image. Unfortunately, however, this implementation requires the system to keep lists of words in one or more languages, and requires the human to be literate in one of the languages for which the system has a list of words.

Another CAPTCHA implementation is PIX. PIX is an imaged-based CAPTCHA implementation that utilizes a large database of labeled images. All of the pictures stored in the database are pictures of well known objects, such as a horse, a table, a flower, etc, each of which are labeled with the appropriate name of the object. PIX picks an object label at random (e.g., "horse"), finds six images of having that object label from its image database, and presents the images to a user. The user must then input a label that correctly matches the known label for the object. Similar to GIMPY, this implementation requires the system to keep lists of words for each picture in one or more languages, and requires the human to be literate in one of the languages for which the system has a list of words.

The underlying assumption of these CAPTCHAs implementations is that current image recognition algorithms run by computer software agents cannot match human performance in identifying the content of images. But many image recognition algorithms are becoming increasingly sophisticated. For example, some bots take advantage of the vast corpus of images available on the Internet to serve as a basis for "training" image recognition algorithms to defeat current CAPTCHA implementations. Further, because CAPTCHAs are ultimately designed by human programmers with varying levels of skill, bots are able to defeat poorly designed CAPTCHAs. In sum, many existing CAPTCHAs are not well implemented and are easily broken by bots. CAPTCHA designers typically respond to this threat by making the tests increasingly difficult. Unfortunately, this often results in a CAPTCHA test that is too difficult for many human users to consistently pass.

SUMMARY

To distinguish human users from computer software agents in an online environment, embodiments of the invention generate time-varying image tests, provide the tests to users, analyze each user's responses to selected tests, and determine whether each user is a human user.

In one embodiment, a test generator is used to generate an original CAPTCHA image. The image can contain, for example a word, phrase, or other human-identifiable content. The test generator also generates a sequence of positions for overlapping a set of secondary images generated from the original image. The sequence of positions are configured such when properly aligned in an overlaying relationship with each other they form a combined image that a human user would recognize as the original CAPTCHA image in whole or in part (i.e. a position that "reveals" at least a portion of the original image).

The sequence of the positions can be a random sequence, a pseudorandom sequence, or a repeating sequence of positions, which positions themselves are randomly generated at runtime. For example, random sequence positions are generated by timing successive pairs of radioactive decays detected by a Geiger-Müller tube interfaced to a computer or by counting successive pulse signals received from a Boltzmann thermal noise circuit interfaced to a computer, and pseudorandom sequence positions are generated by a properly seeded Fortuna algorithm. The proper alignment of the images is preferably one in which the secondary images overlap each other with a specific combination of horizontal and vertical (X, Y) position that achieves the proper horizontal and vertical (X, Y) offset of the secondary images relative to one another to reveal at least a portion of the original image. Other combinations of the positions result in other combined images that are not the original image, typically presenting an image of random pixels.

The test generator also generates the set of two or more secondary images, each of which has some subset of the pixels of the original image; the pixels of the secondary images may also be further processed to alter their respective values. The secondary images are configured to the (X,Y) positions and the original image so that when the secondary images are displaced over time responsive to the (X,Y) positions at least one of the (X,Y) positions causes the secondary images to align to reveal an image that a human would recognize as at least a portion of the original CAPTCHA image.

The test generator can create any number of CAPTCHA tests in this fashion, using various different original images. In one alternative the test generator creates a test that reveals portions of the original image along varying horizontal and vertical planes at different times. For example, assuming that the user is a human user, one properly aligning combination would reveal a first portion the original image, such as the left half, while the next properly aligning combination would reveal a second portion of the original image, such as the right half. Of course, the number of different combinations necessary to reveal all of the portions of the original image can be increased.

In another alternative, the test generator creates a test that reveals only portions of the original image at any one time. For example, if the original image contained the text "T X V", the test generator could generate horizontal and vertical positions that would reveal the letters "T" and "V" at one time, and the letter "X" at another time, but do so in such a way that a human user could recognize the original image as "T X V", and be able to correctly answer a CAPTCHA test with this letter sequence.

In yet another alternative, the test generator creates a test that includes multiple original images that a human user would recognize and mentally associate as combining to form the correct answer to a CAPTCH test. For example, a test could include a number of original images (e.g. three) in which the first original image is an image of the letter "T", the second original image is an image of the letter "X", and the third original image is an image of the letter "V". The test generator would then would then generate horizontal and vertical (X,Y) positions that would reveal at least a portion of each original image at various different times so that a human user could easily recognize the individual ones of the original images "T", "X", and "V", and be able to correctly answer a CAPTCHA test accordingly that required an answer of all three letters.

When a CAPTCHA test is needed, a CAPTCHA test server transmits to the user's web browser a set of secondary images and an executable code. The browser executes the code, which causes the display of the secondary images in a sequence of positions with respect to each other over time such that the secondary images will periodically align to result in a combined image that is the original CAPTCHA image (or portions thereof). During this time, a human user would see a time-variant sequence of images, some of which are unintelligible, but which, periodically, aligns to reveal the intelligible original CAPTCHA image (or portions thereof) with the identifiable content. Because most humans can quickly and easily extract intelligible content from noisy images, as well as reconstruct content from partial images, most human users will be able to quickly and easily recognize the intelligible content in the original CAPTCHA image from the test (e.g., the embedded word). The user would then input the recognized content into a form in the browser, in order to solve the CAPTCHA.

Image and text recognition software programs cannot perform this task without great effort. For example, in one method of solving this CAPTCHA implementation a computer software agent implementing image or text recognition software would be forced to recreate the series of combined images using the secondary images, and then analyze each of the combined images using image or text recognition software until the original CAPTCHA image is discovered. This task is further complicated where the combined secondary images reveal only portions of the original image; in this case, the recognition programs must analyze the individual images and accumulate the portions over time, and then combine the resulting analysis. This method is difficult for malicious third users because it takes additional time and results a higher client-side computational load being placed on their processors, thereby severely impeding their ability to rapidly solve the CAPTCHA. A second method for solving for this CAPTCHA implementation is to execute or emulate the test on the client side and process the resulting images with image or text recognition software. However, this too is undesirable to malicious third-party users for at least the same reasons as the previous method.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
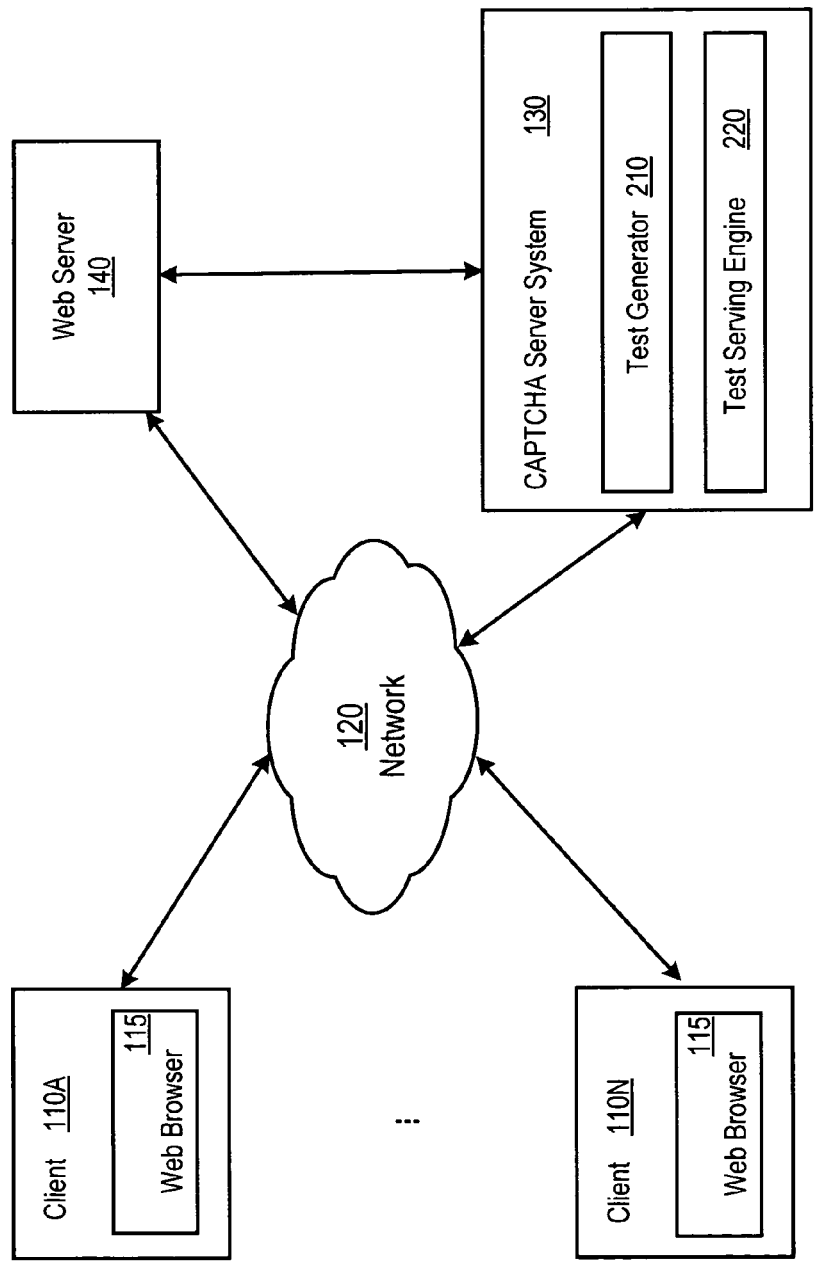
FIG. 1 is a high-level diagram illustrating an environment having a time-varying CAPTCHA image server system according to one embodiment.

FIG. 1 is a high-level diagram illustrating an environment having a CAPTCHA server system 130 that generates and provides CAPTCHA tests to users according to one embodiment. Based on the user's response to a CAPTCHA test, the CAPTCHA server system 130 distinguishes a human user from a computer software agent. The environment comprises one or more clients 110 connected to a CAPTCHA server system 130, and a web server 140 via a computer network 120.

A client 110 communicates with the CAPTCHA server system 130 through the computer network 120. The client 110 can be a personal computer (PC) in one embodiment, or a mobile handset or any other electronic computing device. A user associated with the client 110 may be a human user, or a computer software agent. Only two clients 110 and one CAPTCHA server system 130 are illustrated in FIG. 1 for the purpose of simplification, however, in practice there can be thousands or millions of clients 110 using one or more CAPTCHA server systems 130. Further, other computer servers, such as a web server 140, are communicatively coupled with the CAPTCHA server system 130 via the network 120. The web server 140 serves web pages to the clients 110, and can request a test from the CAPTCHA server system 130 to be included in such pages, so as to test whether a human user is operating the client 110 to access the web server 140. The web server 140 and the CAPTCHA server system 130 can be hosted on the same or different systems and/or domains. The client 110 executes a web browser 115, either as a standalone application, or with similar functionality embedded in another application.

In general, a client 110 may be any type of suitable processor-based platform that is adapted to connect to a network 120 and interact with one or more application programs. Client 110 may operate on any operating system capable of supporting a browser or browser-enabled application, such as Microsoft® Windows® (any variant thereof) or Linux, or the like.

The CAPTCHA server system 130 shown comprises a test generator 210 and a test serving engine 220. The CAPTCHA server system 130 provides CAPTCHA tests to a web server 140 or some application server to distinguish a human user from a computer software agent. Generally, a server is depicted as a single computer system but may be implemented as a network of computer processors. Examples of devices suitable for implementation as CAPTCHA server system 130 are mainframe computers, networked computers, a processor-based device, and similar systems and devices. These devices may require some modification and may be implemented alone or in combination to achieve the utility of CAPTCHA server system 130.

Figure 2:
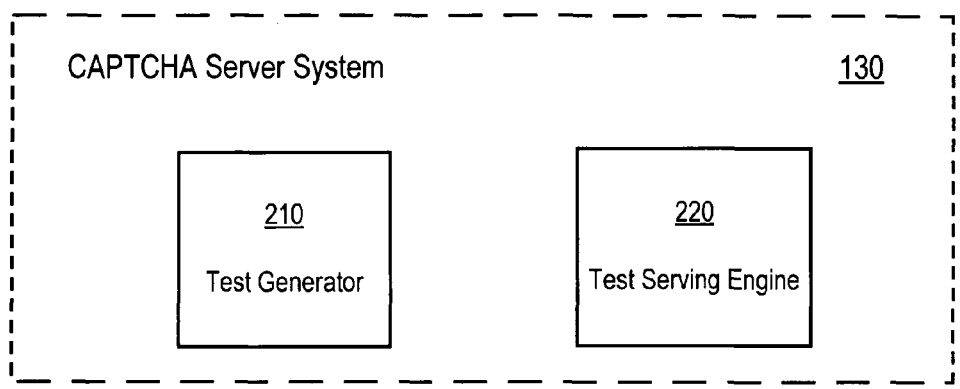
FIG. 2 is a high-level block diagram of a time-varying CAPTCHA image server system according to one embodiment.

FIG. 2 is a high-level block diagram of a CAPTCHA server system 130 according to one embodiment. The CAPTCHA server system 130 is comprised of two processing engines: the test generator 210; and the CATCHA test serving engine 220. The test serving engine 220 exposes an application programming interface to web server 140 that allows the web server 140 to request a test, which is then included in a web page served by the web server 140 to the client 110. Upon receiving a request for a test, the test generator 210 generates a CAPTCHA test, and provides it to the test serving engine 220. The test serving engine 220 provides the test to web server 140, receives a response to the test, analyzes the response, and determines whether the response is correct. In one embodiment, the test generator 210 and the test serving engine 220 are implemented in dedicated hardware components (e.g., a computing device including an ASIC, FPGA) coupled to, or integrated into the computer(s) of server system 130. In another embodiment, the generator 210 and the engine 230 are implemented as computer programs stored in a computer readable storage medium, and executed by a processor of the computer of the server system 130. Those of skill in the art will appreciate that these implementations are functionally equivalent.

Figure 3:
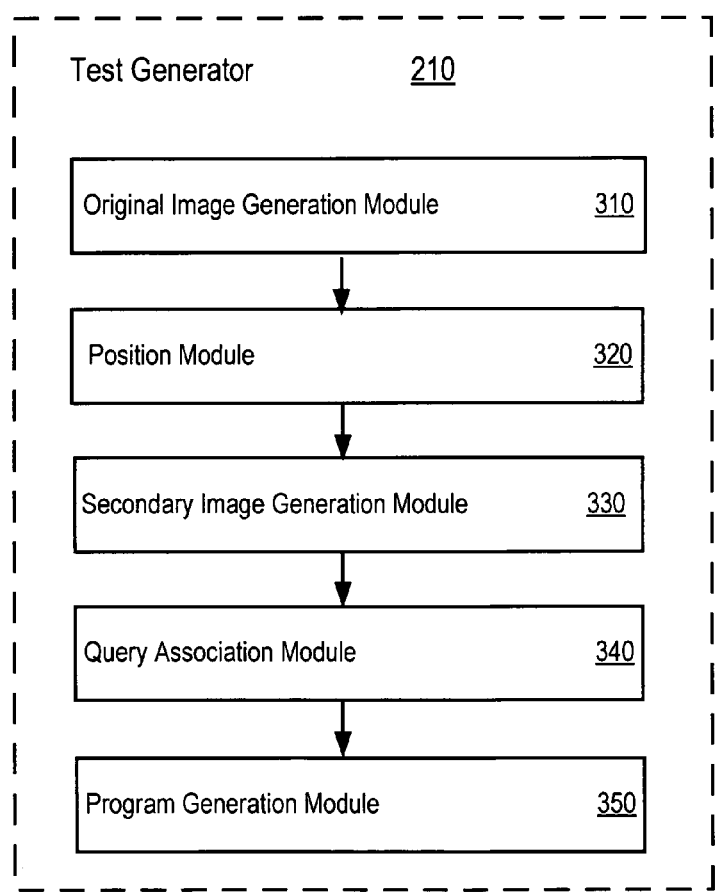
FIG. 3 is a high-level block diagram illustrating modules within a test generator according to one embodiment.
Figure 8:
FIG. 8 is an illustration of an original image.

FIG. 3 is a high-level block diagram illustrating modules within a test generator 210 according to one embodiment. The test generator 210 comprises an original image generation module 310, a position module 320, a secondary image generation module 330, a query association module 340 and a program generation module 350. Upon test serving engine 220 receiving a request for a test from web server 140, original image generation module 310 generates an original CAPTCHA image. The original image can be an image of distorted or undistorted text, such as used in conventional CAPTCHA images, an image of a recognizable object (e.g., a person, animal, place), or any other image containing human recognizable content. For example, the FIG. 8 illustrates an original image of the undistorted text "T X V". It will be understood that although this original image is undistorted text, the composite image that reveals this original image can form distorted or undistorted text.

The position module 320 receives the original image and generates a sequence of positions for overlapping a set of secondary images. A position can be defined in a variety of ways, so long as it results in the secondary images being displayed with some amount of horizontal and/or vertical offset. For example, a position can be defined as an (X,Y) offset of one secondary image from another secondary image, or as a tuple of (X,Y) locations for the upper left corner of each of the secondary images, or any other mathematically equivalent format. The sequence of positions can be random, pseudorandom, repeating or a combination thereof. The position module 320 can be configured to generate all possible combinations of (X,Y) positions, or generate only a subset of all possible combinations while still ensuring that at least one of the combinations of the positions causes the secondary images to overlap by the proper amount to reveal the original image, either in its entirety or a portion thereof as explained above. In one embodiment, the sequence module 330 can implement a maximal period linear congruential number generator and a maximal period linear feedback shift register to generate a set of sequence of positions for overlapping the secondary images. For example, a maximal period linear congruential number generator can be used to generate one of eight possible values for the horizontal position (Y) of the secondary images and a maximal period linear feedback shift register is used to generate one of seven possible values for the vertical position (X) of the secondary images. Because the numbers seven and eight are relatively prime, all fifty-six possible offsets will appear, including the combination of (X,Y) positions that reveals the original image. In another example, the position module 320 could be configured so that only a subset of the possible offsets are generated, while still ensuring that the subset includes the combination of (X,Y) positions that reveals the original image.

The secondary image generation module 330 receives the original image and generates a set of two or more secondary images by separating the original image so that each secondary image contains a subset of the pixels of the original image. The pixels may be further processed by additional bit operations (e.g., change in luminance, color, etc.). In one embodiment, the secondary images are generated such that when these secondary images are displayed in one or more overlapping alignments using the predetermined horizontal and vertical positions, the resulting composite image reveals the original image.

Figure 10A:
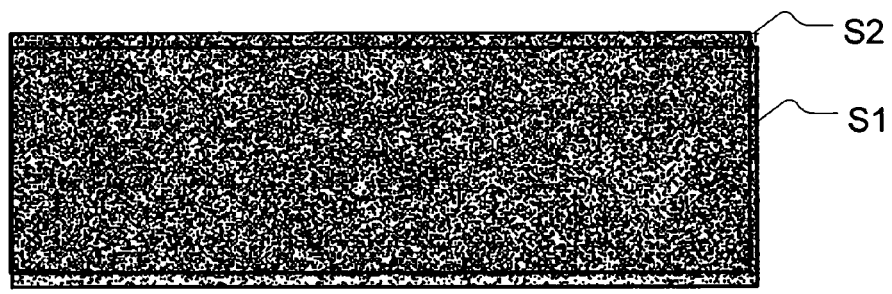
FIGS. 10a, 10b, and 10c illustrate the three composite images that do not overlap to form a composite image that reveals an original image.
Figure 10B:
Figure 10C:
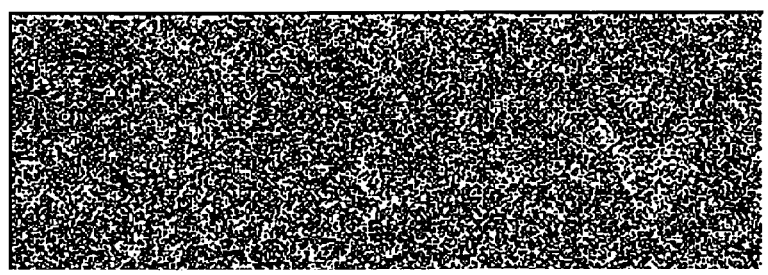

For example, FIGS. 10a, 10b and 10c are illustrations of a two of secondary images S1 and S2 overlapping using predetermined horizontal and vertical positions to form a properly aligning composite image that reveals an original image of the text "T X V". (The borders of the secondary images S1 and S2 are shown only for convenience in these illustrations; in an actual embodiment, they need not appear). FIGS. 10a, 10b, and 10c illustrate three composite images that do not overlap to reveal an original image.

Figure 9:
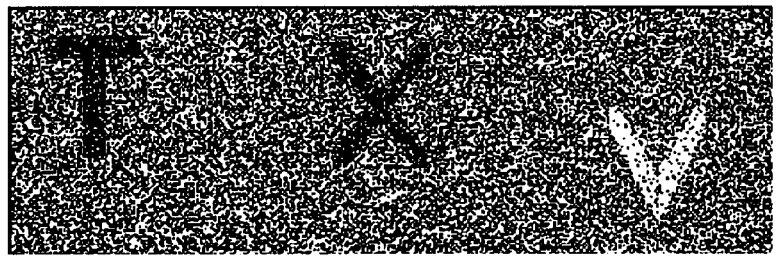
FIG. 9 is an illustration of a number of secondary images overlapping using predetermined horizontal and vertical positions to form a composite image that reveals an original image.
Figure 11:
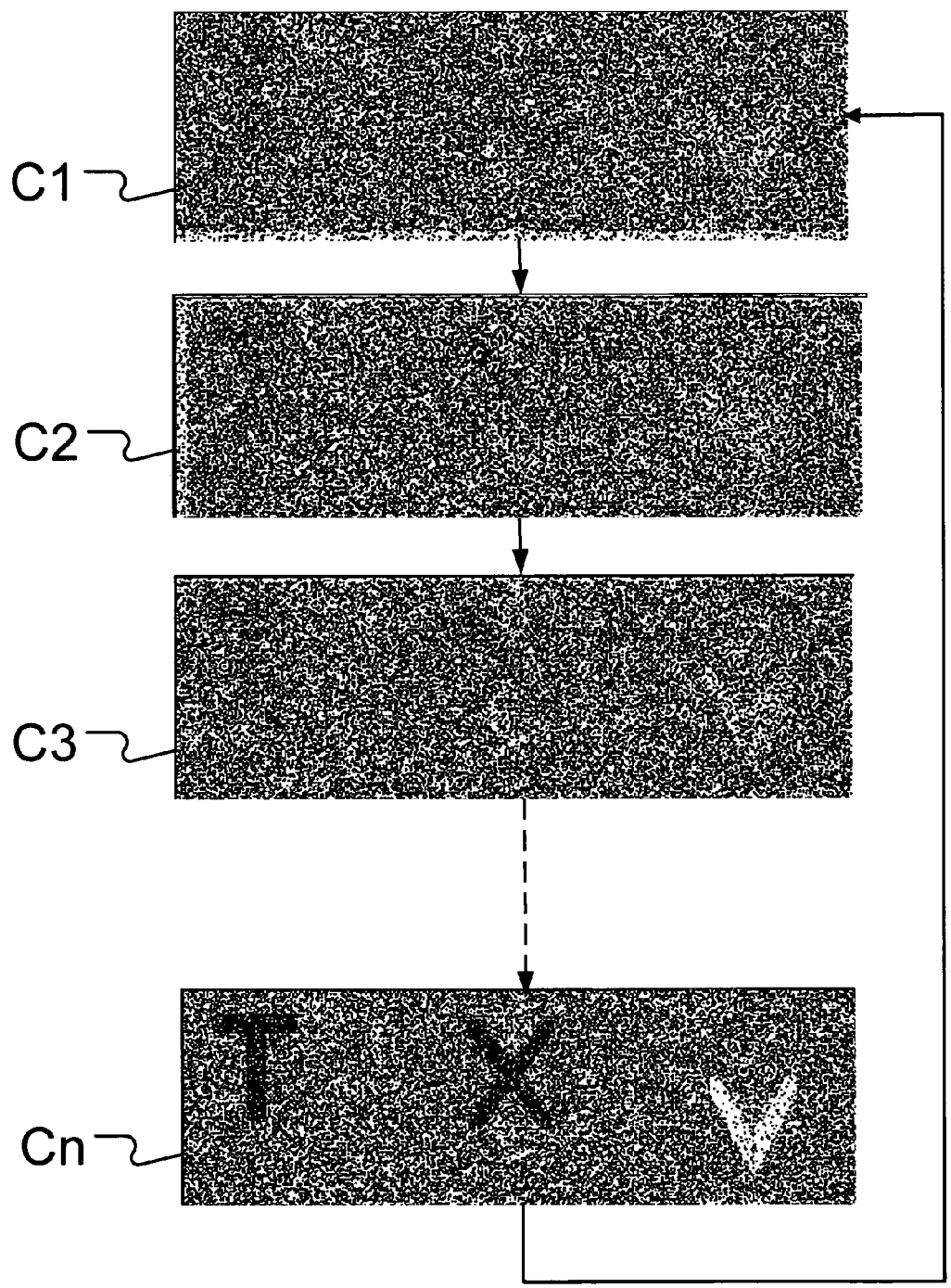
FIG. 11 is a flowchart illustrating a cycle through multiple combinations of (X,Y) positions assigned to the secondary images to eventually form a composite image that reveals an original image.

FIG. 11 is a flowchart of a process that cycles through multiple combinations of (X,Y) positions assigned to the secondary images to form at least one properly aligning composite image that reveals an original image, or portion thereof. Here, C1 is the composite image illustrated in FIG. 10a, C2 is the composite image illustrated in FIG. 10b, C3 is the composite image illustrated in FIG. 10c, and Cn is the composite image illustrated in FIG. 9, which shows again the original image. Each of these composite images is presented for a limited time interval, for example three to five seconds. It will be understood that the properly aligning composite image in FIG. 11 is labeled Cn to communicate the fact that while here only four combinations of (X,Y) positions where required to reveal the original image, in practice the combinations of (X,Y) positions may be calculated so that many more combinations are used before the original image is revealed.

It will also be understood that in practice the properly aligned composite image is not necessarily a composite of all the secondary images generated, but can be a composite formed of less than all of the secondary images generated so long as at least two secondary images are overlapping to form the composite image. Finally, it will be understood that in practice all these images would be communicated over a webpage and may be adapted for that purpose.

In addition, the composite image may be formed in various ways from the secondary images. In one embodiment, a given pixel $P_c$ of the composite image is the sum of the pixel values of the overlaying pixels $P_{si}$ and $P_{sj}$ of the secondary images $S_i$ and $S_j$ used for the composite. In other embodiments, a given pixel $P_c$ can be based on the difference in pixels in $S_i$ and $S_j$, or on any other function.

Figure 12:
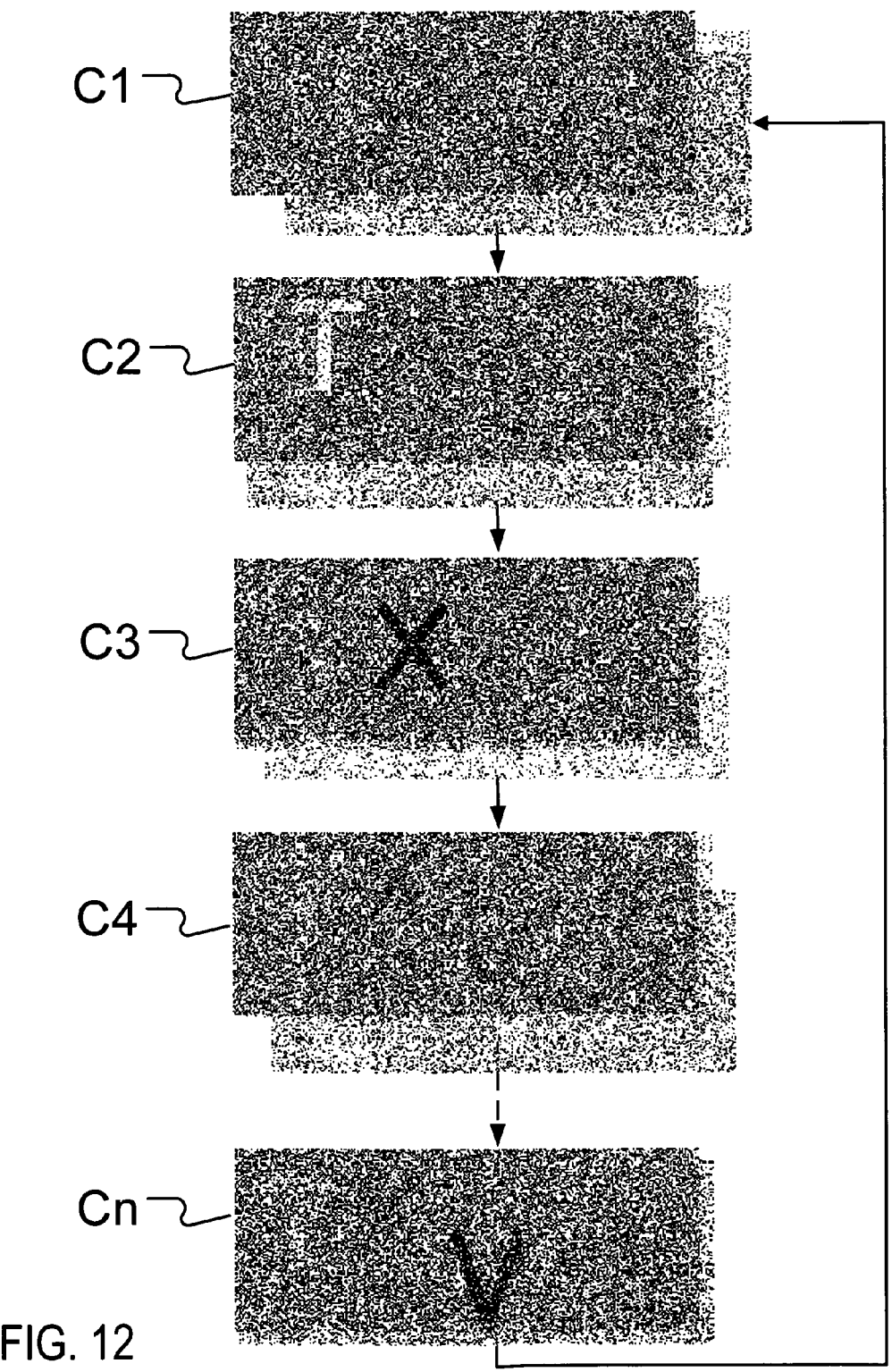
FIG. 12 is flowchart illustrating a cycle through multiple combinations of (X,Y) positions assigned to the secondary images in which portions of the original image are revealed at different iterations.

In another embodiment, the secondary image generation module 330 can also operate to generate the secondary images so that different portions of the original image are visible at different times depending on the varying (X,Y) horizontal and/or vertical positions of the secondary images. A human user would easily see the different parts of the original image appear as the secondary images are iteratively positioned over time, and then determine the complete content of the image, such as identifying the underlying word, image, or other intelligible content. For example, FIG. 12 illustrates a CAPTCHA test according to this embodiment. Here, C1 is a composite image that reveals random pixels, C2 is a properly aligning composite image that reveals the letters "T" and "V," C3 thru C4 are composite images that reveal random pixels, and Cn is a properly aligning composite image that reveals the letter "X". Each of these composite images is shown for a limited time interval, as above. Most human users would recognize individual portions of the original image, and be able to identify the proper text string "T X V" as an answer to a CAPTCHA test.

This approach is particularly powerful to defeat software agents, since no single one of the composite images from the combination of the secondary images results in the original image. Thus, attempts by malicious third parties to repeatedly take snapshots of the overlapping images and perform image analysis will never generate the entire original image at once, and additional analysis will be required to recover the entire original image from the portions of the image that are recovered. This additional analysis would be so computationally expensive as to preclude a successful attack.

In yet another embodiment, the original image generation module is adapted to generate a plurality of original images which combine to form a single answer to a CAPTCHA test. Portions of the original images are revealed to the user in composite images at different times and at varying horizontal and/or vertical locations. A human user would easily see the different parts of the original images appear as the secondary images are iteratively positioned over time, and then determine the complete content of the images, such as identifying the underlying word, image, or other intelligible content.

Figure 13:
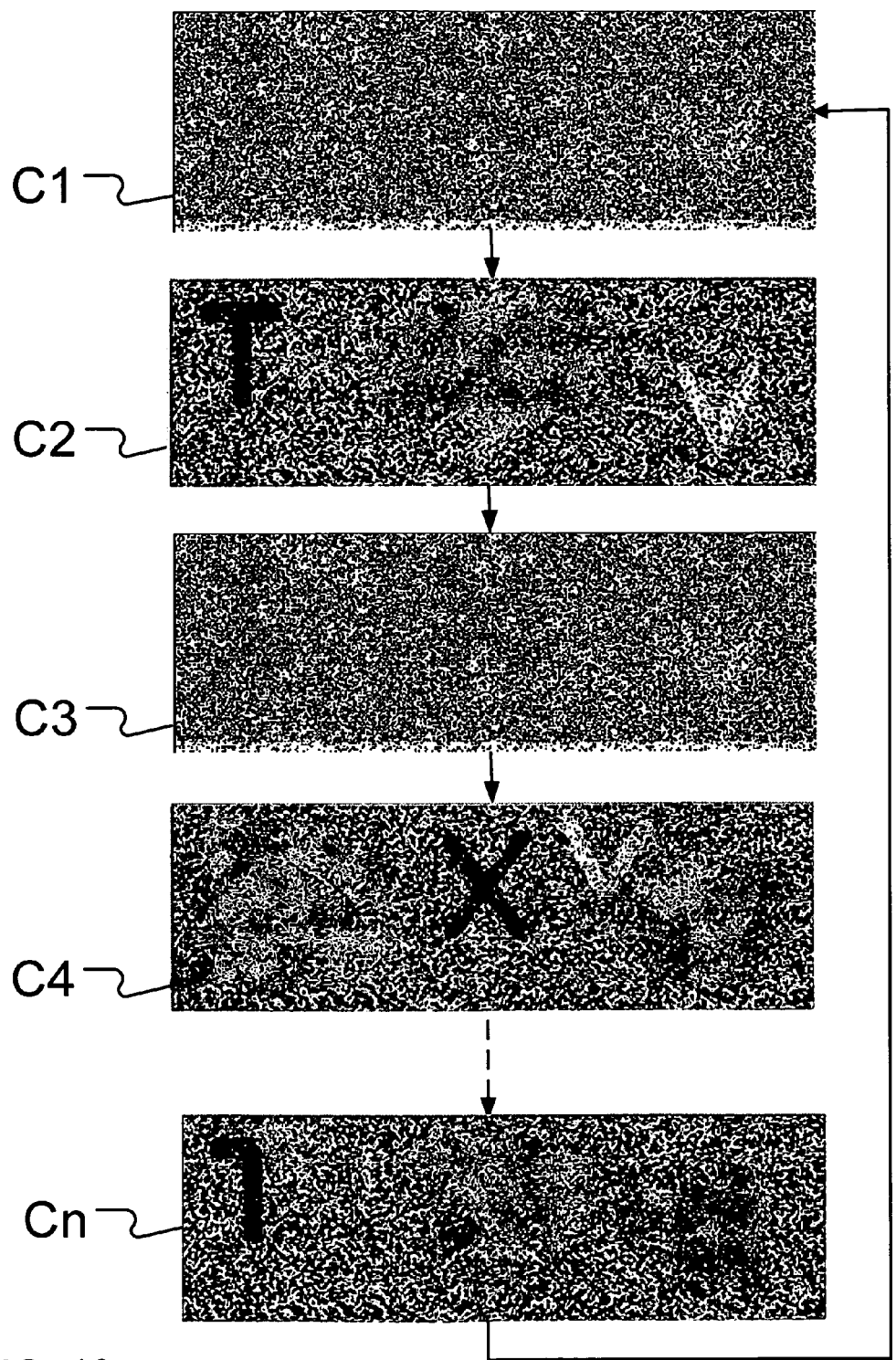
FIG. 13 is flowchart illustrating a cycle through a CAPTCHA test having three original images, with multiple combinations of (X,Y) positions assigned to the secondary images.

For example, FIG. 13 illustrates a CAPTCHA test according to this embodiment. Here, there are three original images of the letters "T", "X", and "V", respectively. C1 is a composite image that reveals random pixels, C2 is a properly aligned composite image that reveals the letters "T" and "V," C3 is composite image that reveals random pixels, C4 is a properly aligned composite image that reveals the letters "X" and "V" where "V" is at a different horizontal and vertical position than in the previous iteration in which "V" was revealed, and Cn is a properly aligned composite image in which a portion of the letter "T" is revealed. Each of these composite images is shown for a limited time interval, as above. Furthermore, the positions of the primary images are configured so that they maintain their location relative to one another. In other words, while the horizontal position of each letter may vary, the left to right ordering of the letters stays the same. For example, the location of the "X" may shift to the left or right slightly, but it will always appear to be between the locations of the "T" and the "V", so that the resulting sequence remains "T X V" regardless of the shifting positions of the individual letters. Thus, most human users would recognize each of the original images, and be able to identify the proper text string "T X V" as an answer to a CAPTCHA test requiring the user to identify the letters in order.

The query association module 340 then associates a CAPTCHA query and answer combination with the secondary images. Ideally, the query is a generic question that would apply to any word or image embodied in the original image. Examples queries include:

"What image is displayed?"

"What word is displayed?"

"How many red dots are there?"

"Which way is the blue arrow pointing: Left or Right?"

The answer to the query is an input that is the word, name of the image embodied in the original image, or any other meaningful response which is known at the time the original image is generated. For example, the last two questions above would be used with images of a set of red dots, or a blue arrow, respectively.

Figure 14:
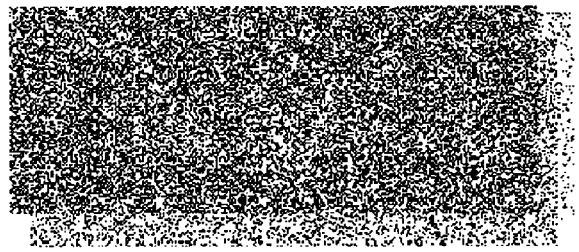
FIG. 14 is a screenshot of a CAPTCHA test and the query.

The program generation module 350 then encodes the positions as part of an executable program that can be executed by the client web browser. The sequence can be encoded either algorithmically or as a lookup table of positions, or in any other manner that requires the client web browser to iteratively process the sequence information and display the secondary images according to the position information. The CAPTCHA query is encoded as well into the executable program. The set of secondary images and executable program comprise the CAPTCHA test. For example, FIG. 14 is a screenshot of a CAPTCHA test and the query "What three letters are illustrated below?"

Figure 4:
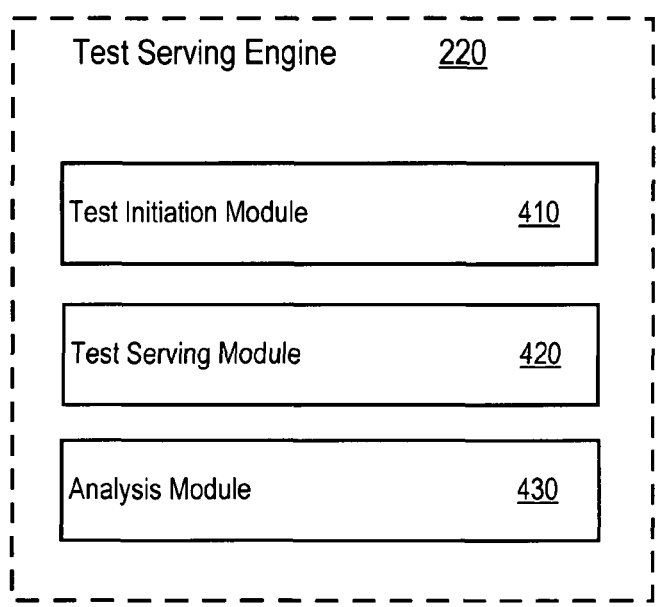
FIG. 4 is a high-level block diagram illustrating modules within a test serving engine according to one embodiment.

FIG. 4 is a high-level block diagram illustrating modules within a test serving engine 220 according to one embodiment. The test serving engine 220 comprises a test initiation module 410, a test serving module 420, and an analysis module 430. The test initiation module 410 exposes an application programming interface to web server 140 that allows the web server 140 to request a test. The web server 140 will typically request a test upon receiving a request for a particular web page that has been encoded to include a CAPTCHA test, such as a registration page for an online application. In order to construct the page, the web server 140 requests a test from the test generator 210.

Upon receiving a request for a test, the test generator 210 generates a test in any of the ways described above, producing a set of secondary images and associated executable program. The executable program can be in any client-side executable languages, such as Java applet, Adobe Flash, DHTML, or the like. The web server 140 provides a web page with the test to the client 110 over the network 120. The web server 140 also receives from the test generator 210 the query answer, and provides this answer along with an identifier of the client (e.g., client's IP address) to the analysis module 430 so that the analysis module 430 can validate the answer at a later time.

The client's browser 115 executes the executable program, and as a result, iteratively displays the secondary images through the encoded positions. The program can be executed within the webpage from which the browser made the request, or on a separate page.

The executable program also displays the associated query, and a form field for receiving a response to the query. Once the response is submitted, it is provided to the analysis module 430. The analysis module 430 compares the response to the answer associated with the test. If the response matches the answers, then the client browser 115 is allowed to proceed with further interactions with the web server 140, for example, accessing an online service or the like. If the response does not match the answer, the browser 115 is denied further access.

Since humans sometimes make mistakes in answering CAPTCHA tests, the analysis module 430 can be configured to allow multiple attempts at a correct response, up to a limit. In this embodiment, the analysis module 430 includes a counter to ensure that the user does not enter more than a predetermined number of responses. The user enters a response to the query, and the analysis module 430 increments the counter and checks whether the counter has reached the predetermined threshold value. In one embodiment, the predetermined threshold value for the counter is four, thereby allowing three attempted answers. In other embodiments, the predetermined threshold value for the counter is another reasonably small integer number. If the counter reaches the predetermined threshold value, the user's browser is denied further access to the web server, based on the assumption that the "user" is in fact a software agent. Otherwise, the analysis module 430 notifies the test generator 210 and the test serving engine 220 that a new test needs to be sent to the user, or simply allows the user to enter another response to the original test.

In another alternative, analysis module 430 includes a user timer to ensure that the user does not spend more than a predetermined period of time answering the question. The test serving engine 220 sends a test to the user, and the timer begins to clock the amount of time that has expired since the user received the test. If the timer reaches the predetermined period of time, the user's browser is blocked from further access to the webserver. In this case, the test serving engine 220 will no longer accept answers to the queries sent to the user. The reason for this is to limit the window of opportunity for computer software agents to search the internet or internal databases for the answer to the test. However, if the response is determined to be the answer to the query and the timer has not reached the predetermined period of time, the user's browser is allowed further access to the web server 140, as the user is deemed to be a human user.

Figure 15:
FIG. 15 is a screenshot of a CAPTCHA test in which a properly aligning composite image is revealed.

The visual effect of the iteratively overlaid multiple secondary images can be obtained in various different ways. In one alternative, test generator 210 generates overlapping semi-transparent animated images that mimic the effect of moving static images relative to one another, or to generate a video clip that mimics the same. In yet another alternative, test generator 210 uses an algorithm (perhaps embodied in JavaScript) to render a sequence of images comprised of moving lines and other geometric objects that periodically align as recognizable characters, without ever having created an image file on the server. For example, FIG. 15 is a screenshot of a CAPTCHA test in which a properly aligning composite image reveals the text "T X V".

In yet another alternative, upon receiving the original image, the secondary image generation module 210 generates one or more time-varying functions, zero or more static data sets, and a combining function. From these functions and data sets secondary image generation module 210 generates a time-varying image that periodically displays the original image. In one example of such a system, test generator 210 generates an encrypted bitmap image ("a static data set"), and test serving engine 220 sends the encrypted bitmap image to web server 140 which displays the results of decrypting the image ("the combining function") with a series of keys generated by a time-varying function within a web page served to web browser 115 by web server 140.

Figure 5:
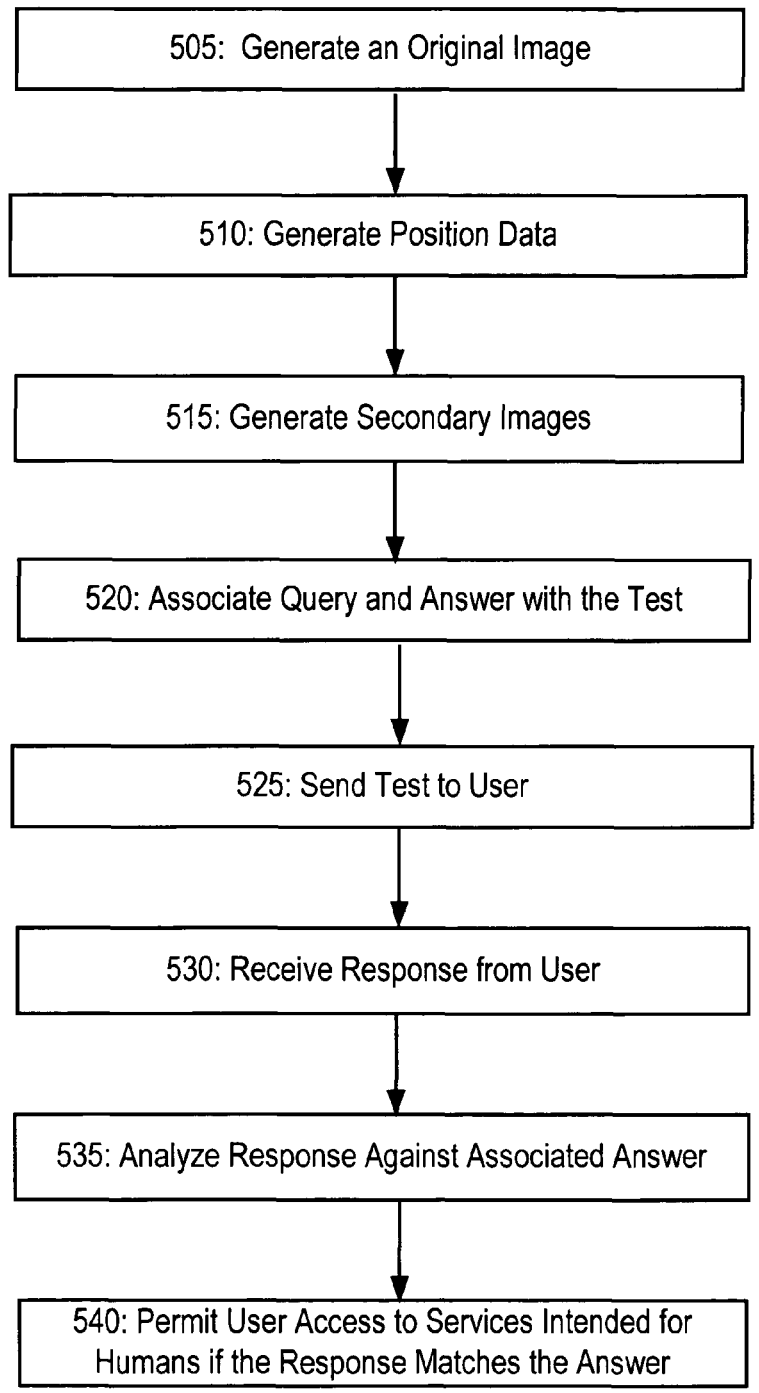
FIG. 5 is a flowchart showing a method of using the CAPTCHA server system to one embodiment.

FIG. 5 is a flowchart showing a method of using the CAPTCHA server system 130 according to one embodiment. A typical embodiment of the CAPTCHA server system 130 processes a large volume of requests concurrently. Thus, the CAPTCHA server system 130 concurrently performs multiple instances of the steps described here, for example, in multiple threads.

Initially, within test generator 210, original image generation module 310 generates 505 an original image. The position module 320 then generates 510 positions for overlapping a set of secondary images such that one or more of the positions causes the secondary images to overlap by the proper amount to reveal the original image (in whole or in part), and encodes the positions in an executable program. The positions can be a repeating sequence of positions or a random sequence of positions when encoded in the executable program or when presented on the client side. The secondary image generation module 330 then generates 515 a set of two or more secondary images by separating the original image. The query association module 340 then associates 520 a query and answer combination with the test, and also encodes the query into the program. The test serving engine 220 sends 525 the test to the user. Upon receipt 530 of the response from the user, analysis module 430 analyzes 535 the response from the user to ascertain whether the response matches the associated answer. If the response matches the answer, the user is permitted access to services intended specifically for humans.

Figure 6:
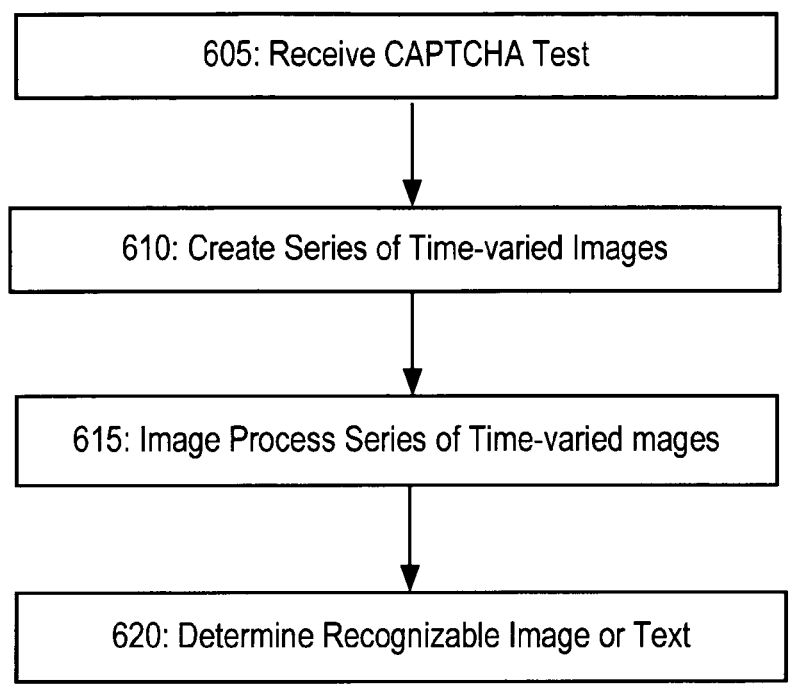
FIG. 6 is a flowchart showing a method of ascertaining a recognizable image from a CAPTCHA test by creating a series of time-varied images according to one embodiment.

It should be appreciated as well that a malicious user may configure a computer software agent to attempt to defeat the CAPTCHA system described herein. Such a software agent would repeatedly access the CAPTCHA system and attempt to thwart the CAPTCHA system. FIG. 6 is a flowchart illustrating an embodiment of a method that a software agent may use to ascertain a recognizable object (e.g., a recognizable image or sequence or text) from a CAPTCHA test. Client 110, a computer software agent, receives 605 a test. Upon receiving the test, client 110 creates 610 a series of images by overlapping the secondary images at different steps in the time sequence (i.e. take "snapshots" of the secondary images). This would be done, for example by extracting the images from the document object model of the webpage, and then repeatedly combining them into a various combined images. The software agent would then processes 615 each of the combined images using software adapted to recognize objects (e.g., image or text recognition software) until a recognizable object is discovered 620, or some termination condition is met (e.g., a limit on the number of attempts is reached). The agent would then input that object (e.g., a text string) into an answer field on the CAPTCHA test page. Alternatively (or additionally), the software agent would store information identifying the images (e.g. a hash of the image) along with information about the discovered object (e.g., the supposed answer to the CAPTCHA test). This information could then be recalled at a later time. Of course, since the software agent would not have prior information as to the one or more positions of the secondary images that result in proper alignment for the combined image, the agent would likely have to try a very large number of possible position combinations, perhaps thousands.

Figure 7:
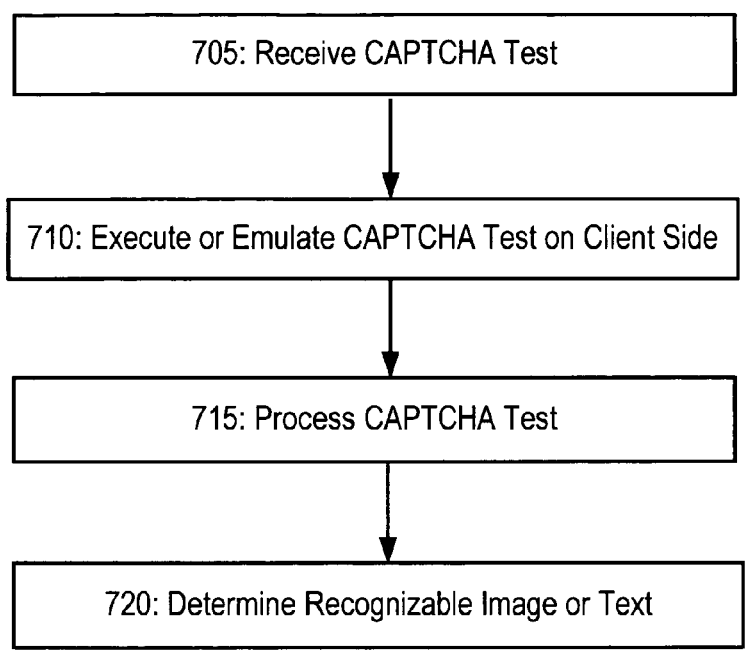
FIG. 7 is a flowchart showing a method of ascertaining a recognizable image by executing or emulating the CAPTCHA test on the client side according to one embodiment.

It should be appreciated as well that there are alternative methods a malicious user might employ when configuring a computer software agent to attempt to defeat the CAPTCHA system described herein. For example, FIG. 7 is a flowchart showing an alternative method of ascertaining a recognizable object from a test according to one embodiment. Client 110, a computer software agent, receives 705 a test. Upon receiving the test, client 110 executes 710 the algorithm on the client side and processes 715 each of the time-variant images using image or text recognition software until a recognizable image or text sequence is discovered 720.

It should be appreciated as well that the CAPTCHA system described herein is not limited to CAPTCHA tests, and can be modified to increase the difficulty of text recognition for any purpose. For example, web crawlers search the internet for websites including illegal advertisements, e.g., advertisements for illegal goods and/or services, pornography, (generally "inappropriate content"). A malicious person can modify the method described above for FIG. 5 to create an illegal advertisement (or other inappropriate content) as an image that is undetectable by web crawlers but recognizable by humans by modifying, which hinders automatic detection of the advertisement. For example, within the test generator 210, the original image generation module 310 generates 505 an original image of an advertisement for illegal drugs. The position module 320 generates 515 positions for overlapping a set of secondary images such that one or more of the positions causes the secondary images to overlap by the proper amount to reveal the original image of the advertisement for illegal drugs (in whole or in part), and encodes the positions in an executable program. The secondary image generation module 330 generates 515 a set of two or more secondary images by separating the original image. The result is a cryptographically secure illegal advertisement that is subsequently posted to a website by the malicious person.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein, such as the server system 130. This apparatus may be specially constructed for the required purposes, or it may comprise a general-purpose computer selectively activated or reconfigured by a computer program stored on a computer readable medium that can be accessed by the computer, to perform the operations and function described above. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer program product comprising a non-transitory computer-readable storage medium having computer-executable program instructions embodied therein for configuring a computer system to execute:
    a test generator, configured to:
        generate an original image;
        separate the original image into a plurality of secondary images;
        generate a set of positions for the plurality of secondary images, the set including at least one position at which the secondary images overlap to form a composite image that reveals at least one portion of the original image, and at least one position at which the secondary images overlap to form a composite image that does not reveal any portion of the original image,
        associate a CAPTCHA query and an answer with the secondary images; and
    a test program generator configured to:
        generate an executable program that is adapted for execution by a client device having a display, and encoded with the set of positions, the CAPTCHA query, the answer, and the executable program configured to displace on the display of the client device, the secondary images over time responsive to the set of positions.

2. The computer program product of claim 1, further comprising:
    a test serving engine, configured receive a request for a test from a web browser to access a web server engine, send the secondary images and the executable program to a web browser responsive to the request, receive a response to the CAPTCHA query from the user, and analyze the response to determine if the response matches the answer.

3. The computer program product of claim 1, wherein the secondary images and the positions are configured to reveal the at least one portion of the original image at varying locations in the original image.

4. The computer program product of claim 1, wherein the secondary images and the positions are configured to reveal a plurality of portions of the original image at any one time.

5. The computer program product of claim 1, wherein the original image is an image of a word, phrase, or any human identifiable content.

6. The computer program product of claim 1, wherein the composite image is formed of a portion of each of a plurality of the secondary images.

7. The computer program product of claim 1, wherein the secondary images are semi-transparent animated images that mimic the effect of moving static images relative to one another.

8. The computer program product of claim 1, wherein the secondary images include at least one video clip that mimics the effect of moving static images relative to one another.

9. The computer program product of claim 1, wherein the positions and the executable program are configured to render the secondary images as images of geometric objects that periodically align to form the at least one composite image that reveals at least a portion of the original image.

10. The computer program product of claim 1, wherein the test generator is configured to generate the secondary images and the positions by generating one or more time-varying functions, zero or more static data sets, and a combining function, and from the time varying functions, the static data sets, and the combining function generate a time-varying sequence of images that periodically reveals the original image.

11. The computer program product of claim 2, wherein the test serving engine further comprises a counter to count a number of attempts at a correct response, and wherein the test serving engine is configured to allow a predetermined number of attempts at a correct response and then block the web browser from accessing the web server.

12. The computer program product of claim 2, wherein the test serving engine further comprises a user timer to determine an amount of time the user has spent in providing the response to a question, and wherein the test serving engine is configured to block the web browser from further accessing the web server after a predetermined amount of time.

13. The computer program product of claim 10, wherein the time-varying sequence of images is a random sequence.

14. The computer program product of claim 10, wherein the time-varying sequence of images is a repeating sequence.

15. A method executed on computer for generating tests for distinguishing a human user from a computer software agent in an online application, the method comprising:
    generating an original image;
    separating the original image into a plurality of secondary images;
    generating a set of positions for the plurality of secondary images, the set of positions including at least one position at which the secondary images overlap to form a composite image that reveals at least one portion of the original image, and at least one position at which the secondary images overlap to form a composite image that does not reveal any portion of the original image;
    associating a CAPTCHA query and an answer with the secondary images; and
    generating an executable program, adapted for execution by a client device having a display, and encoded with the set of positions, the CAPTCHA query, the answer, and the executable program configured to displace on the display of the client device, the secondary images over time responsive to the set of positions.

16. The method of claim 15, further comprising:
    sending the secondary images and the executable program to a client device;

receiving a response to the CAPTCHA query from the client device; and analyzing the response to determine if the response matches the answer.

17. The method of claim 15, wherein the secondary images and the positions are configured to reveal the at least one portion of the original image at varying locations in the original image.

18. The method of claim 15, wherein the secondary images and the positions are configured to reveal a plurality of portions of the original image at any one time.

19. The method of claim 15, wherein the original image is an image of a word, phrase, or any human identifiable content.

20. The method of claim 15, wherein the composite image is formed of a portion of each of a plurality of the secondary images.

21. The method of claim 15, wherein the secondary images are semi-transparent animated images that mimic the effect of moving static images relative to one another.

22. The method of claim 15, wherein the secondary images include at least one video clip that mimics the effect of moving static images relative to one another.

23. The method of claim 15, wherein the positions and the executable program are configured to render the secondary images as images of geometric objects that periodically align to form the at least one composite image that reveals at least a portion of the original image.

24. The method of claim 15, wherein the secondary images and the positions are generated by one or more time-varying functions, zero or more static data sets, and a combining function, and from the time varying functions, the static data sets, and the combining function generate a time-varying sequence of images that periodically reveals the original image.

25. The method of claim 16, wherein the client's response is blocked after a predetermined number of attempts at a correct response.

26. The method of claim 16, wherein the client's response is blocked after a predetermined amount of time.

27. The method of claim 24, wherein the time-varying sequence of images is a random sequence.

28. The method of claim 24, wherein the time-varying sequence of images is a repeating sequence.

29. A computer program product comprising a non-transitory computer-readable storage medium having computer-executable program instructions embodied therein for configuring a computer system to generate tests for distinguishing a human user from a computer software agent in an online application, the program instructions for configuring the computer system to perform steps comprising:

generating an original image;

separating the original image into a plurality of secondary images;

generating a set of positions for the plurality of secondary images, the set of positions including at least one position that forms a composite image that reveals at least one portion of the original image, and at least one position that forms a composite image that does not reveal any portion of the original image;

associating a CAPTCHA query and an answer with the secondary images; and generating an executable program, adapted for execution by a client device having a display, and encoded with the set of positions, the CAPTCHA query, the answer, and the executable program configured to displace on the display of the client device, the secondary images over time responsive to the set of positions.

30. The computer program product of claim 29, the steps further comprising:

sending the secondary images and the executable program to a client device;

receiving a response to the CAPTCHA query from the client device; and analyzing the response to determine if the response matches the answer.

31. The computer program product of claim 29, wherein the secondary images and the positions are configured to reveal the at least one portion of the original image at varying locations.

32. The computer program product of claim 29, wherein the secondary images and the positions are configured to reveal a plurality of portions of the original image at any one time.

33. The computer program product of claim 29, wherein the original image is an image of a word, phrase, or any human identifiable content.

34. The computer program product of claim 29, wherein the composite image is formed of a portion of each of a plurality of the secondary images.

35. The computer program product of claim 29, wherein the secondary images are semi-transparent animated images that mimic the effect of moving static images relative to one another.

36. The computer program product of claim 29, wherein the secondary images include at least one video clip that mimics the effect of moving static images relative to one another.

37. The computer program product of claim 29, wherein the positions and the executable program are configured to render the secondary images as images of geometric objects that periodically align to form the at least one composite image that reveals at least a portion of the original image.

38. The computer program product of claim 29, wherein the secondary images and the positions are generated by one or more time-varying functions, zero or more static data sets, and a combining function, and from the time varying functions, the static data sets, and the combining function generate a time-varying sequence of images that periodically reveals the original image.

39. The computer program product of claim 30, wherein the executable program is further adapted to count the number of attempts at a correct response, allow a predetermined number of attempts at a correct response and then block the client device from accessing a web server.

40. The computer program product of claim 30, wherein the executable program is further adapted to determine an amount of time the client device has spent in providing the response to the query, and then block the client device from accessing a web server after a predetermined amount of time.

41. The computer program product of claim 38, wherein the time-varying sequence of images is a random sequence.

42. A method executed on a computer for generating tests for distinguishing a human user from a computer software agent in an online application, the method comprising:

generating a plurality of original images;

separating the original images into a plurality of secondary images;

generating a set of positions, the set of positions including a plurality of positions, including at least one position at which the secondary images overlap to form a plurality of composite images that reveal at least several portions of the original images, and at least one position at which the secondary images overlap to form a composite image that does not reveal portions of any of the original images;
associating a CAPTCHA query and an answer with the secondary images; and
generating an executable program encoded with the set of positions, the CAPTCHA query, the answer, and the executable program configured to displace the secondary images over time responsive to the set of positions.

43. The method of claim 41, further comprising:
sending the secondary images and the executable program to a web browser;
receiving a response to the CAPTCHA query from a user; and
analyzing the response to determine if the response matches the answer.

\* \* \* \* \*